(12) United States Patent
Limbrey (10) Patent No.: US 10,647,479 B2
(45) Date of Patent: May 12, 2020

(54) BOTTLE POURER (71) Applicant: POURA LTD., Welwyn Garden City (GB)

(72) Inventor: Dominic Limbrey, Chislehurst (GB)

(73) Assignee: POURA LTD., Welwyn Garden (GB)

(*) Notice: Subject to any disclaimer, the term of this patent is extended or adjusted under 35 U.S.C. 154(b) by 0 days.

(21) Appl. No.: 16/343,646

(22) PCT Filed: Apr. 13, 2018

(86) PCT No.: PCT/GB2018/050984
§ 371 (c)(1),
(2) Date: Apr. 19, 2019

(87) PCT Pub. No.: WO2019/002805
PCT Pub. Date: Jan. 3, 2019

(65) Prior Publication Data
US 2019/0270551 A1 Sep. 5, 2019

(30) Foreign Application Priority Data
Jun. 28, 2017 (GB) .................................. 1710357.3

(51) Int. Cl.
B65D 47/06 (2006.01)
B65D 47/32 (2006.01)
(Continued)

(52) U.S. Cl.
CPC ............. B65D 47/06 (2013.01); B65D 25/38 (2013.01); B65D 25/48 (2013.01); B65D 47/08 (2013.01);
(Continued)

(58) Field of Classification Search
CPC ................................ B65D 47/06; B65D 47/32
(Continued)

(56) References Cited

U.S. PATENT DOCUMENTS 1,484,589 A * 2/1924 Trubek .................. B65D 83/75
222/556
2,439,985 A * 4/1948 Perelson ............ B65D 47/0876
222/80
(Continued)

FOREIGN PATENT DOCUMENTS

EP 2 181 932 A1 5/2010
GB 1910 25505 5/1911
(Continued)

OTHER PUBLICATIONS

PCT/GB2018/050984 International Search Report, dated Jul. 25, 2018.

Primary Examiner — Vishal Pancholi
(74) Attorney, Agent, or Firm — Fay Sharpe LLP (57) ABSTRACT There is provided a bottle pourer (10), comprising a base (20) for fitting to an opening of a bottle, a pourer tube (40) extending from the base for pouring liquid out of the bottle through a mouth at distal end of the pourer tube, and a tube cover (50) that extends from the base to the distal end of the pourer tube. The tube cover (50) is actuable (55) at the base to move between closed and open positions, the tube cover closing the mouth at the distal end of the pourer tube in the closed position, and opening the mouth at the distal end of the pourer tube in the open position.

20 Claims, 4 Drawing Sheets (51) Int. Cl.
*B65D 47/08* (2006.01)
*B65D 49/04* (2006.01)
*B65D 25/38* (2006.01)
*B67D 3/00* (2006.01)
*G01F 11/26* (2006.01)
*B65D 25/48* (2006.01)

(52) U.S. Cl.
CPC ..... *B65D 47/0833* (2013.01); *B65D 47/0876* (2013.01); *B65D 47/32* (2013.01); *B65D 49/04* (2013.01); *B67D 3/00* (2013.01); *G01F 11/265* (2013.01)

(58) Field of Classification Search
USPC .................................................... 222/56–569
See application file for complete search history.

(56) References Cited

U.S. PATENT DOCUMENTS

| | | | | |
|---|---|---|---|---|
| 2,762,521 | A * | 9/1956 | Kipp | B65D 47/0876 |
| | | | | 222/482 |
| 3,630,419 | A * | 12/1971 | Pierce | B65D 47/06 |
| | | | | 222/478 |
| 3,750,915 | A * | 8/1973 | Kearney | B65D 47/14 |
| | | | | 222/567 |
| 3,966,099 | A * | 6/1976 | Sanford, Jr. | B67D 3/00 |
| | | | | 222/478 |
| 5,246,150 | A | 9/1993 | Delia | |
| 5,961,008 | A * | 10/1999 | Peckels | B65D 39/06 |
| | | | | 222/477 |
| 6,230,944 | B1 | 5/2001 | Castellano | |
| 6,742,678 | B1 * | 6/2004 | Krystopik, Jr. | B65D 47/122 |
| | | | | 215/309 |
| 8,011,540 | B1 * | 9/2011 | Peckels | B01F 3/04099 |
| | | | | 222/190 |
| 8,251,352 | B2 * | 8/2012 | Chiorazzi | B01F 3/0446 |
| | | | | 222/190 |
| 8,365,964 | B2 * | 2/2013 | Federighi | B01F 3/0446 |
| | | | | 222/190 |
| 8,528,771 | B2 | 9/2013 | Voss et al. | |
| 8,944,297 | B2 * | 2/2015 | Agassi | B65D 47/263 |
| | | | | 222/481.5 |
| 2008/0099514 | A1 * | 5/2008 | Carter | B65D 47/2037 |
| | | | | 222/472 |
| 2015/0060499 | A1 * | 3/2015 | Silvers | B65D 47/06 |
| | | | | 222/481.5 |
| 2015/0251822 | A1 * | 9/2015 | Slevin | G01F 11/265 |
| | | | | 222/570 |

FOREIGN PATENT DOCUMENTS

| | | |
|---|---|---|
| JP | 2004 331173 A | 11/2004 |
| WO | WO 2011/053579 A1 | 5/2011 |
| WO | WO 2012/172534 A1 | 12/2012 |

* cited by examiner

BOTTLE POURER

The present invention relates to a bottle pourer for fitting to an opening of a bottle.

BACKGROUND OF THE INVENTION

Bottle pourers are commonly used to help pour liquids from bottles at a more consistent and controlled rate than could be obtained by simply pouring directly from the bottle opening. They are commonly fitted to bottles whose contents is to be dispensed in relatively small quantities, for example bottles holding alcoholic spirit drinks. A bottle pourer typically comprise a base which is fitted to the opening of the bottle, and a tube which extends from the base and through which liquid from the bottle is dispensed. Bottle pourers typically restrict flow from the bottle, and since they provide a constant flow rate they can be used by bar staff to dispense a fixed measure of fluid based on how long the fluid is poured for.

One of the problems with known pourers is that the contents of the bottles may attract flies to enter the ends of the pourers, which is unhygienic. It is common practice in many bars to cover the ends of the pourers with cellophane when the bar is closed to help prevent fruit flies from entering the pourers. However, this is time consuming and labour intensive, and does not protect the pourer whilst the bar is open. Bar staff need to dispense drinks to customers quickly, and manually re-covering a pourer with cellophane after each use would be impractical.

Another problem with known pourers is that when used with bottles holding alcoholic drinks, there is a tendency for the alcohol to evaporate away over time. This degrades the quality of the drink and requires bottles to be discarded after they have been open for a certain length of time.

It is therefore an object of the invention to improve upon known bottle pourers.

SUMMARY OF THE INVENTION

According to a first aspect of the invention, there is provided a bottle pourer comprising a base for fitting to an opening of a bottle, a pourer tube extending from the base for pouring liquid out of the bottle through a mouth at distal end of the pourer tube, and a tube cover that extends from the base to the distal end of the pourer tube. The tube cover is actuable at the base to move between closed and open positions, the tube cover closing the mouth at the distal end of the pourer tube in the closed position, and opening the mouth at the distal end of the pourer tube in the open position.

Since the tube cover extends all the way from the base of the bottle pourer to the distal end of the pourer tube, the tube cover can be actuated at the base to control the opening and closing of the mouth of the pourer tube. This allows bar staff to both hold the bottle and control the opening and closing of the mouth of the pourer tube with a single hand. The tube cover is moved to the open position whenever liquid is to be dispensed from the bottle, and moved back to the closed position afterwards where the tube cover prevents fruit flies from entering the mouth of the pourer and helps block or slows the escape of alcohol from the bottle.

The tube cover may be pivotally connected to the base or to the pourer tube adjacent the base, the tube cover being pivotable about an axis perpendicular to the extension of the pourer tube to move between the closed and open positions. Placing the pivot at or nearby the base enables bar staff to easily pivot the tube cover using the same hand as is used to hold the bottle.

To help ease the actuation of the tube cover between open and closed positions, the tube cover may comprise opener and closure paddles at the base of the pourer, wherein pressing the opener paddle pivots the tube cover into the open position, and pressing the closure paddle pivots the tube cover into the closed position.

An opener retention element in the form of an opener tab may extend from the opener paddle to engage the base in the open position, to help prevent unintentional movement of the tube cover into the closed position. Additionally, a closure retention element in the form of a closure tab may extend from the closure paddle to engage the base in the closed position, to help prevent unintentional movement of the tube cover into the open position.

Preferably, the base comprises an air tube which extends through a main body of the base to allow air to enter the bottle when liquid is poured out the pourer tube. The air tube may extend from the base in an opposite direction to the pourer tube. The air tube preferably extends from the base by a distance of at least 20 mm, more preferably at least 30 mm, still more preferably at least 40 mm, so that when pouring liquid from the bottle the air tube delivers air into the bottle above an inlet of the base where liquid enters the base and subsequently into the pourer tube. The tube cover preferably comprises a plug which blocks air from entering the air tube when the tube cover is moved into the closed position. Accordingly, the simple action of moving the tube cover to the closed position achieves three different effects in combination; firstly the tube cover blocks flies from entering the mouth of the pourer tube, secondly the plug of the tube cover blocks flies from entering the air tube, and thirdly the plug of the tube cover stops evaporated alcohol from escaping the bottle via the air tube. As the tube cover is moved into the open position the plug moves to allow air to enter the air tube, so that air can enter the bottle via the air tube and allow liquid to be dispensed via the pourer tube.

The pourer tube may extend into an aperture of the base and lead to a valve cavity, wherein the valve cavity comprises a valve body that opens and closes a pathway into an interior of a bottle to which the bottle pourer is fitted. The valve body closes the pathway when the pourer is not being used to dispense liquid, and so blocks alcohol from evaporating from the bottle. The valve body may provide a more effective means of blocking alcohol evaporation than merely relying on the tube cover covering the mouth of the pourer tube.

The valve cavity is preferably positioned inside the base where there is sufficient room for a large enough valve to not disrupt the flow rate through the pourer tube. Therefore the flow rate through the pourer tube of the present invention can remain the same as the flow rate though the known pourer tubes that are currently in use. This is important since bar staff may judge the quantity of liquid dispensed based on how long the liquid is poured for.

The valve body may be a gravity biased ball valve which opens the pathway when the pourer is in an inverted position, corresponding to an inverted position of the bottle so that liquid can flow out the pourer, and closes the pathway when the pourer is in an upright position, corresponding to an upright orientation of the bottle.

The pourer tube typically extends from the base by a distance of at least 30 mm, more preferably at least 40 mm, still more preferably at least 45 mm, to allow the pourer tube to be easily located over small drinks glasses.

DETAILED DESCRIPTION

Embodiments of the invention will now be described by way of non-limiting example only and with reference to the accompanying drawings, in which.

The figures are not to scale, and same or similar reference signs denote same or similar features.

Figure 1:
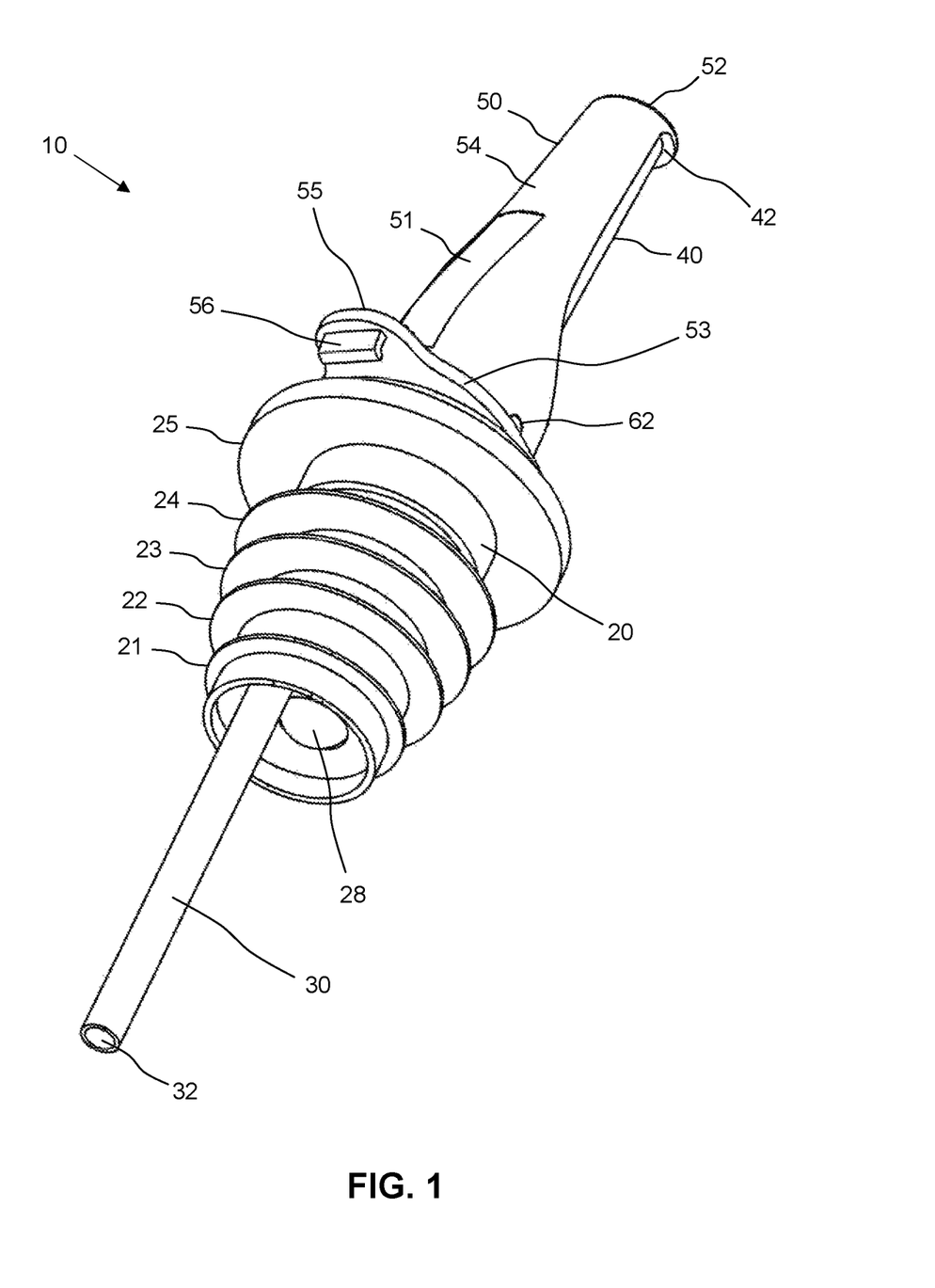
FIG. 1 shows a schematic perspective diagram of a bottle pourer according to an embodiment of the invention.

The schematic diagram of FIG. 1 shows a bottle pourer 10 according to an embodiment of the invention. The bottle pourer 10 comprises a base portion 20, an air tube 30, and a pourer tube 40. The bottle pourer 10 is for fitting into the opening of a bottle (not shown in Figs) to help dispense liquid from the bottle.

The base portion 20 comprises a generally cylindrical body with a series of annular ribs 21, 22, 23, and 24. When the bottle pourer is inserted into a bottle the ribs enter the opening of the bottle to create an airtight seal between the bottle and the bottle pourer. The base portion 20 also comprises an annular collar 25 which is intended to sit upon a rim of the bottle opening when the bottle pourer 10 is fitted to the bottle. The base portion 20 is formed of rubber to provide effective sealing, although alternate materials could be used in alternate embodiments.

The pourer tube 40 extends from the base 20, and is for dispensing liquid from inside the bottle. The pourer tube 40 is a stainless steel tube which fits into the base portion 20. The pourer tube 40 is surrounded by a tube cover 50 which extends along the extension of the pourer tube from the base. The tube cover 50 comprises a hood 54 for covering over the pourer tube and a skirt 53 at an end of the hood 54, the skirt extending outwardly from the hood, substantially perpendicular to the hood.

The hood 54 of the tube cover extends fully around the circumference of the pourer tube 40 adjacent the base of the bottle pourer, and has a cut away portion remote from the base, through which the pourer tube 40 is visible. The tube cover 50 is formed of metal in this embodiment, although other rigid materials could alternatively be used instead. For example, a thermoplastic material, optionally finished with a chrome layer to give a pleasing appearance.

FIG. 1 shows the tube cover 50 in a closed position where a cap portion 52 at a distal end of the tube cover closes off a mouth 42 at a distal end of the pourer tube 40.

The hood 54 of the tube cover 50 has an area 51 where product branding can be added to the hood, for example the brand of the type of liquid in the bottle that the bottle pourer is to be fitted to.

The air tube 30 extends from the base portion 20 in an opposite direction to the pourer tube 40, so the air tube extends into the bottle. The air tube has a mouth 32 for allowing air to pass into the bottle as liquid is dispensed from the bottle, so that the liquid can flow out the bottle freely. The liquid from the bottle enters the base portion 20 though an inlet 28, and subsequently flows through the pourer tube 40. The air tube 30 has a length 34 (refer to FIG. 2) of 40 mm, and so the air leaving the air tube does not disrupt the liquid entering the inlet 28.

The tube cover 50 is pivotally connected to the base of the bottle pourer by two pivots 62 which fit into two respective apertures through opposite sides of the hood, adjacent the base of the bottle pourer. The tube cover 50 can pivot about the pivots 62 between a closed position shown in FIG. 3a and an open position shown in FIG. 3b. The skirt of the tube cover includes an opener paddle 55 that can be pressed (actuated) to pivot the tube cover into the open position of FIG. 3b, and a closure paddle 57 that can be pressed (actuated) to pivot the tube cover into the closed position of FIG. 3a. The pourer tube 40 extends a distance 44 of 46 mm from the base of the bottle pourer, to allow easy dispense of drinks into small glasses.

Figure 3A:
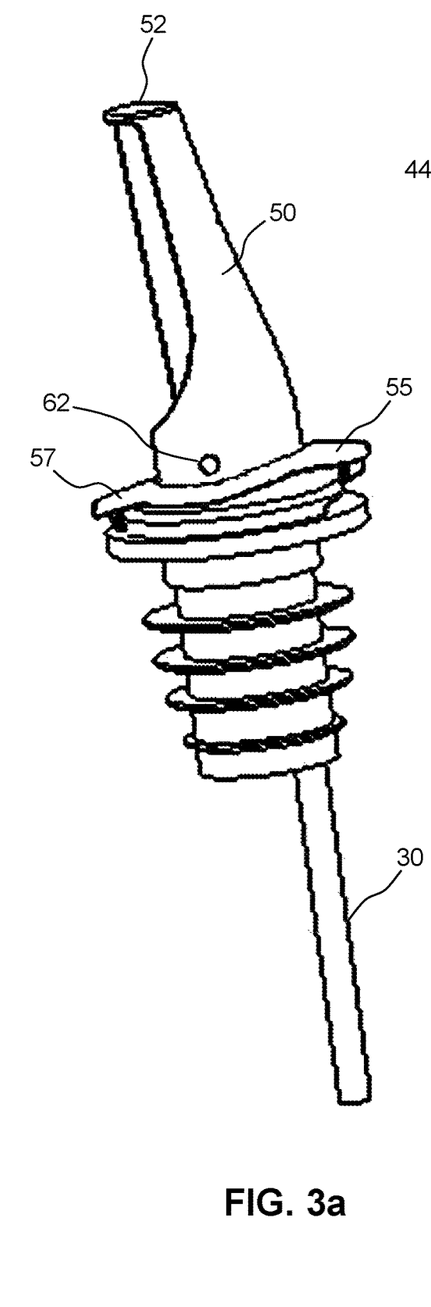
FIG. 3a shows a schematic perspective diagram of the bottle pourer of FIG. 1 with a tube cover in a closed position.
Figure 3B:
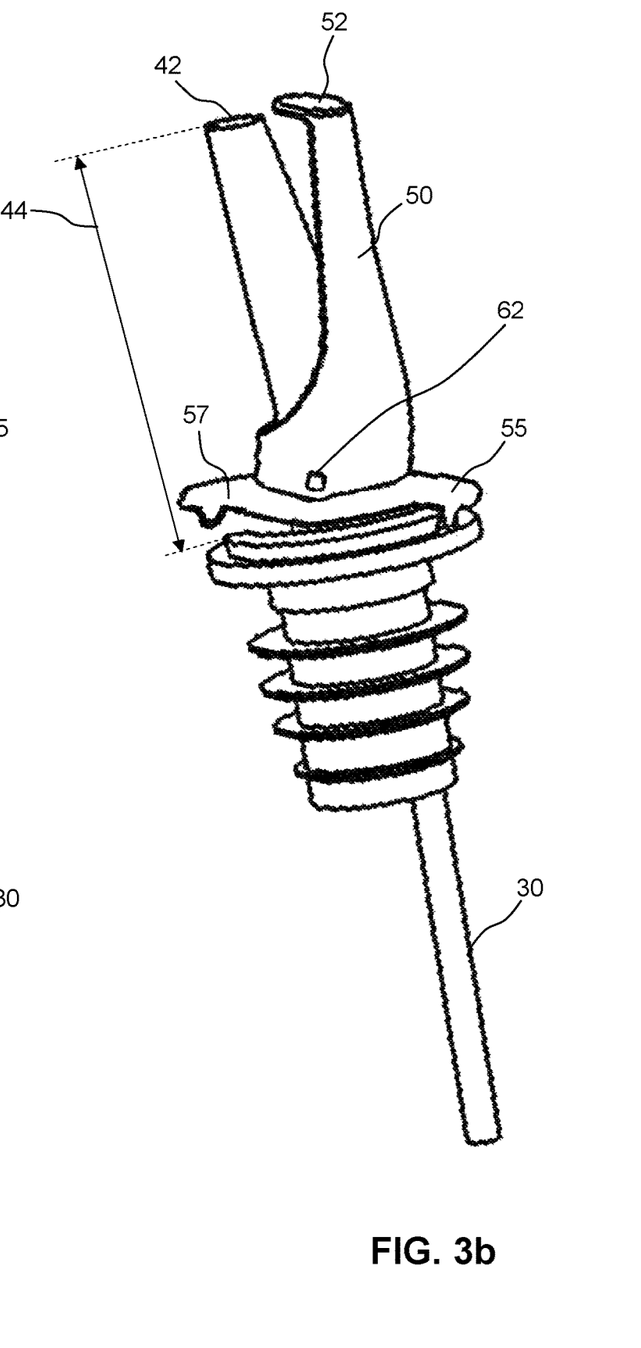
FIG. 3b shows a schematic perspective diagram of the bottle pourer of FIG. 1 with the tube cover in an open position.

In the closed position shown in FIG. 3a, the cap 52 of the tube cover closes off the mouth 42 of the pourer tube so that no flies can enter the pourer tube 40. In the open position shown in FIG. 3b, the cap 52 of the tube cover is withdrawn from the mouth 42 of the pourer tube so that liquid can be poured from the bottle and out of the mouth 42.

Figure 2:
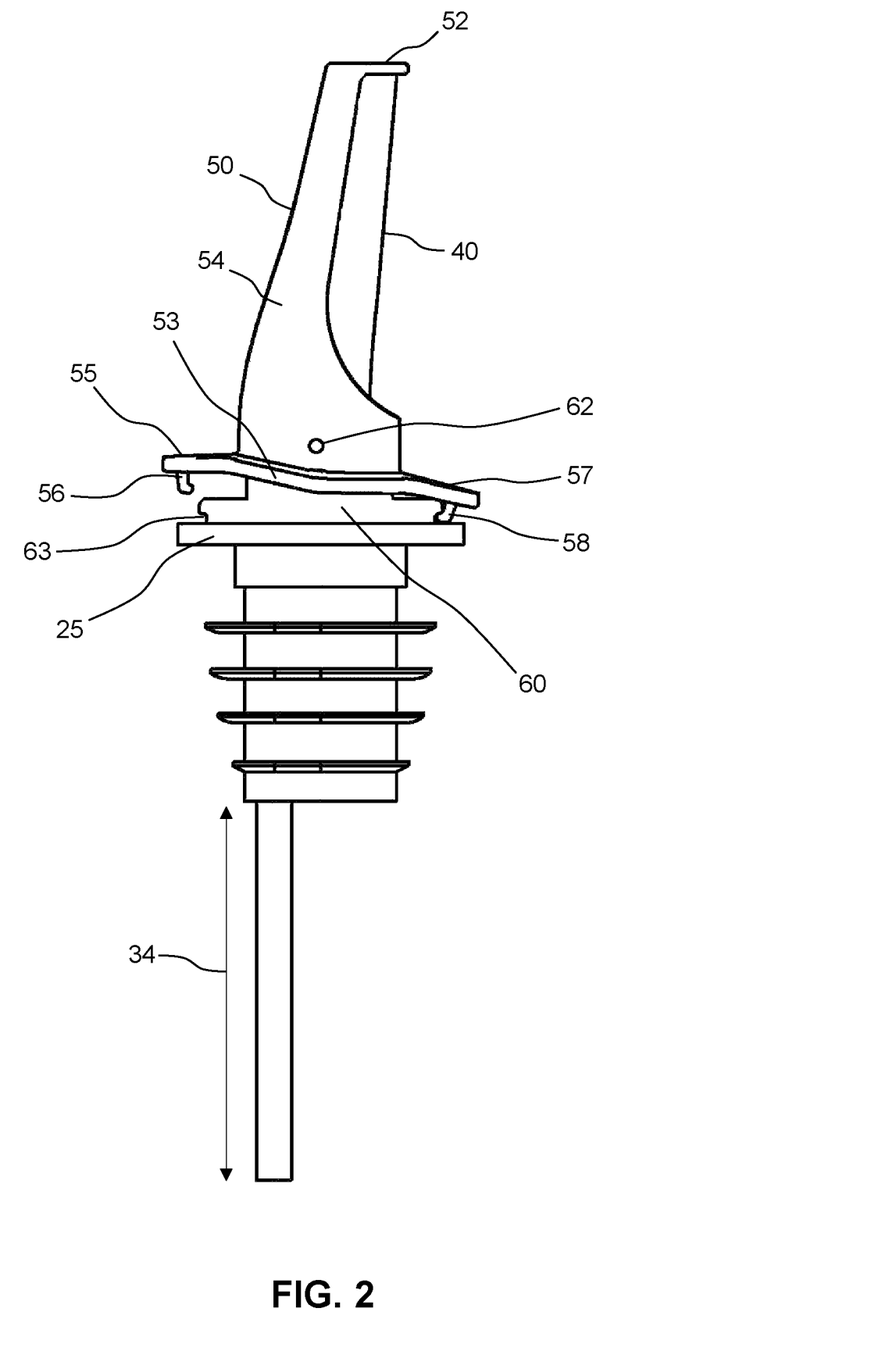
FIG. 2 shows a schematic side view of the bottle pourer of FIG. 1.

Now referring to FIG. 2, the base of the bottle pourer further comprises a base cover 60 that is fixedly mounted on the collar 25 of the base portion 20. The base cover 60 is in the shape of a hat, with the brim of the hat joined to the collar 25 and the top of the hat being inside the part of the hood 54 that is adjacent to the base of the bottle pourer. The top of the hat has a hole through which the pourer tube 40 extends, and the top of the hat also has the two pivots 62 extending in opposite directions to one another on opposite sides of the hat, which locate into the apertures through the hood 54. The pivots extend from the top of the hat in directions generally parallel to the brim of the hat. The base cover 60 seals around a circumference of the pourer tube 40.

The skirt 53 of the tube cover has the paddles 55 and 57 located at opposite sides of the skirt, and each paddle has a corresponding retention element in the form of a tab which engages the base cover. Specifically, the opener paddle 55 has an L-shaped opener tab 56 which extends from the skirt towards the base, and the closure paddle 57 has a similar L-shaped closure tab 58 which extends from the skirt towards the base, at an opposite side of the skirt from where the L-shaped opener tab 56 is located. When the tube cover is moved into the open position (shown in FIG. 3b), the L-shaped opener tab 56 locates into a retention element in the form of a recess 63 at the brim of the hat shaped base cover 60, to retain the tube cover in the open position until the closure paddle 57 is pressed. When the tube cover is moved into the closed position (shown in FIG. 3a), the L-shaped closure tab 57 locates into a retention element in the form of a recess at the brim of the hat shaped base cover 60, to retain the tube cover in the closed position until the opener paddle 55 is pressed. Clearly, other types of retention element than the L-shaped closure tabs of the tube cover and the recesses of the base cover could be implemented in alternate embodiments.

Figure 4:
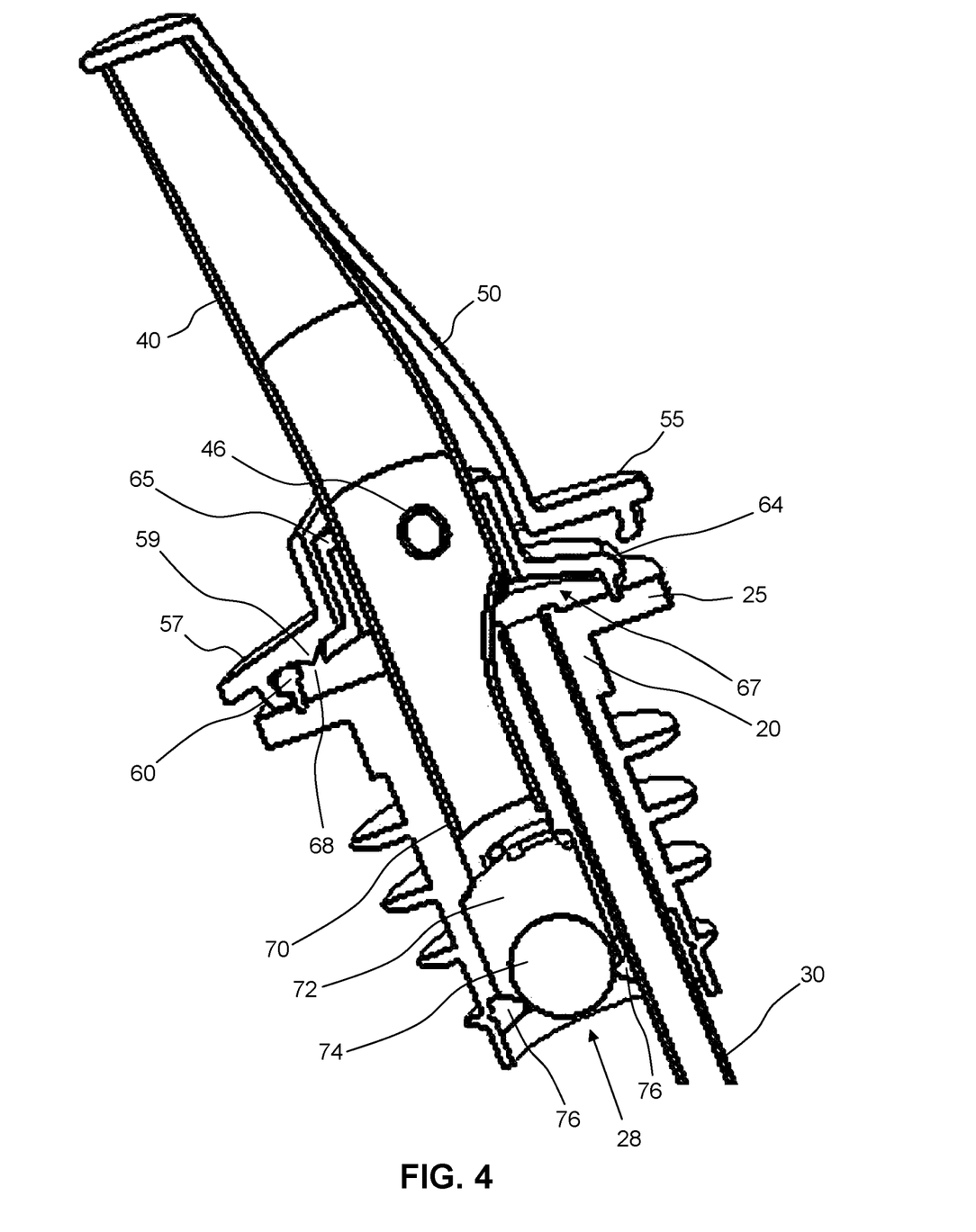
FIG. 4 shows a cross-sectional diagram of the bottle pourer of FIG. 1.

The interior of the base of the bottle pourer 10 can be seen in the cross-sectional diagram of FIG. 4, where the tube cover is in the closed position. The pourer tube 40 is located in an aperture 70 through the base portion 20, and the aperture 70 leads to a valve cavity 72. When the bottle pourer is fitted to a bottle, the pourer tube 40, aperture 70, and valve cavity 72, collectively form a passageway to the interior of the bottle, via the inlet 28 at the bottom of the base.

The valve cavity houses a valve ball 74 which is free to move up and down the cavity 72 under the influence of gravity. When the bottle pourer is orientated as shown in FIG. 4 with the pourer tube 40 extending upwardly, as is the case when the bottle pourer is fitted to a bottle standing in its normal upright orientation, the valve ball 74 rests upon a valve seating 76, and so closes off the inlet 28. This prevents evaporated alcohol from passing through the valve cavity and escaping the bottle when the bottle is being stored in a normal upright orientation. When the bottle pourer is inverted, as is the case when the bottle is inverted to dispense liquid, the valve ball 74 leaves the valve seating 76 and so liquid is free to flow around the valve ball and into the pourer tube 40. Clearly, other types of valve could be implemented in alternate embodiments, or the valve may be omitted entirely and the cap 52 of the tube cover relied upon to prevent escape of alcoholic evaporation.

Also visible in FIG. 4 is the brim 64 and the top 65 of the hat shaped base cover 60. The air tube 30 extends into an aperture through the base portion 20, and leads to an interior cavity 67 between the collar 25 and the base cover 60. The distal end of the air tube 30 is not shown in FIG. 4 for clarity. The brim 64 of the base cover is sealed against the collar 25, and the hole through the top 65 of the base cover through which the pourer tube passes is sealed against the pourer tube, to prevent any evaporated alcohol that is present in the interior space 67 between the collar 25 and the base cover 60 from escaping the bottle pourer. The base cover 60 is formed of a thermoplastic material to provide rigidity for the pivots 62 that hold the tube cover, however alternate materials could be implemented in alternate embodiments.

The brim 64 of the base cover has an air hole 68 for allowing air to enter the interior space 67 and then the air tube 30 when liquid is being poured from the bottle. The paddle 57 of the tube cover 50 comprises a plug 59 which plugs the hole 68 when the tube cover is in the closed position to prevent evaporated alcohol from escaping the interior space 67. When the tube cover 50 is moved to the open position, the plug 59 moves upwardly away from the hole 68, unblocking the hole 68 so that air may enter the hole 68 and the air tube 30 to allow liquid to be dispensed from the bottle. The plug 59 may be formed as an elastomeric insert in the metal paddle 57, to help provide effective sealing of the hole 68 when the tube cover is in the closed position.

The interior of the pourer tube 40 has a dome shaped protrusion 46, and a corresponding dome shaped depression on the outside of the pourer tube 40. The base cover 60 has a protrusion inside the top of the hat shape, which fits into the dome shaped depression on the outside of the pourer tube 40. The protrusion inside the top of the hat shape is located on an opposing side of the wall of the hat from where the pivot 62 is located, and so the location of the protrusion into the dome shaped depression helps provides additional support to the pivot 62. Clearly other types of pivotal connection could be implemented in alternate embodiments, for example the pivots 62 could be formed as part of the pourer tube 60, or the of the tube cover 50.

Many other variations of the described embodiments falling within the scope of the invention will be apparent to those skilled in the art. For example, the bottle pourer may have a screw cap for fitting it to the opening of a bottle, rather than a ribbed insert as shown in the drawings. The screw cap fitting could be formed by extending the base cover to include cylindrical portion beneath the brim of the hat-shape, the cylindrical portion having internal screw threads for screwing onto the bottle. Product branding could then be added to the exterior of the cylindrical portion.

The invention claimed is:

1. A bottle pourer, comprising a base for fitting to an opening of a bottle, a pourer tube extending from the base for pouring liquid out of the bottle, through a mouth at distal end of the pourer tube, and a tube cover that extends from the base to the distal end of the pourer tube, wherein the tube cover is actuable at the base to move between closed and open positions, the tube cover closing the mouth at the distal end of the pourer tube in the closed position, and opening the mouth at the distal end of the pourer tube in the open position, and opening the mouth at the distal end of the pourer tube in the closed position, wherein the tube cover comprises a closure retention element that engages with the baase when the tube cover is in the closed position, to prevent unintentional movement of the tube cover to the open position.

2. The bottle pourer of claim 1, wherein the tube cover is pivotally connected to the base or to the pourer tube adjacent the base, the pivotal connection configured to pivot the tube cover about an axis perpendicular to the extension of the pourer tube to move the tube cover between the closed and open positions.

3. The bottle pourer of claim 2, wherein the tube cover comprises an opener paddle adjacent the base, the opener paddle being pressable towards the base to pivot the tube cover into the open position.

4. The bottle pourer of claim 2, wherein the tube cover comprises a closure paddle adjacent the base, the closure paddle being pressable towards the base to pivot the tube cover into the closed position.

5. The bottle pourer of claim 1, wherein the tube cover comprises a closure retention element that engages with the base when the tube cover is in the closed position, to prevent unintentional movement of the tube cover to the closed position.

6. The bottle pourer of claim 1, wherein the base comprises an air tube which extends through a main body of the base to allow air to enter the bottle when liquid is poured out the pourer tube.

7. The bottle pourer of claim 6, wherein the tube cover comprises a plug which blocks air from entering the air tube when the tube cover is in the closed position.

8. The bottle pourer of claim 1, wherein the base comprises a base cover, and wherein the base cover comprises a closure retention element which engages with the closure retention element of the tube cover in the closed position.

9. The bottle pourer of claim 5, wherein the base comprises a base cover, and wherein the base cover comprises an opener retention element which engages with the opener retention element of the tube cover in the open position.

10. The bottle pourer of claim 2, wherein the base comprises a base cover, and wherein the pivotal connection of the tube cover to the base is a pivotal connection of the tube cover to the base cover.

11. The bottle pourer of claim 6, wherein the base comprises a base cover, and wherein the air tube opens into an interior space between the main body of the base and the base cover of the base, and wherein the base cover comprises an aperture for air to enter the interior space.

12. The bottle pourer of claim 11, wherein the tube cover comprises a plug which blocks air from entering the air tube when the tube cover is in the closed position, and wherein the plug of the tube cover blocks the aperture of the base cover when the tube cover is in the closed position.

13. The bottle pourer of claim 1, wherein the pourer tube extends into an aperture of the base and leads to a valve cavity inside the base, and wherein the valve cavity comprises a valve body which opens and closes a pathway a pathway into an interior of a bottle when the bottle pourer is fitted to an opening of the bottle.

14. The bottle pourer of claim 13, wherein the valve body is a gravity biased ball valve which opens the pathway when the pourer is in an inverted position, corresponding to an inverted position of the bottle so that liquid can flow out the pourer, and closes the pathway when the pourer is in an upright position, corresponding to an upright orientation of the bottle.

15. The bottle pourer of claim 1, wherein the base comprises a plurality of annular ribs around a circumference of the base, the annular ribs for friction fitting the bottle pourer into an opening of a bottle.

16. The bottle pourer of claim 2, wherein the axis perpendicular to the extension of the pourer tube extends through a centre of the pourer tube.

17. The bottle pourer of claim 1, wherein the tube cover comprises a hood which extends fully around a circumference of the pourer tube adjacent the base.

18. The bottle pourer of claim 17, wherein the tube cover comprises a skirt extending outwardly from the hood, substantially perpendicular to the hood.

19. The bottle pourer of claim 18, wherein the tube cover comprises an opener paddle adjacent the base, the opener paddle being pressable towards the base to pivot the tube cover into the open position, wherein the tube cover comprises a closure paddle adjacent the base, the closure paddle being pressable towards the base to pivot the tube cover into the closed position, and wherein the skirt comprises the opener and closure paddles located at opposite sides of the skirt to one another.

20. The bottle pourer of claim 1, wherein the tube cover is pivotally connected to the base, the pivotal connection configured to pivot the tube cover about an axis perpendicular to the extension of the pourer tube to move the tube cover between the closed and open positions, wherein the base comprises a base cover, wherein the base cover comprises a top portion that extends inside of the tube cover, and wherein the pivotal connection is a pivotal connection of the tube cover to the top portion of the base cover.

* * * * *

UNITED STATES PATENT AND TRADEMARK OFFICE
CERTIFICATE OF CORRECTION

| | |
|---|---|
| PATENT NO. | : 10,647,479 B2 |
| APPLICATION NO. | : 16/343646 |
| DATED | : May 12, 2020 |
| INVENTOR(S) | : Dominic Limbrey |

It is certified that error appears in the above-identified patent and that said Letters Patent is hereby corrected as shown below:

In the Claims

Claim 1 should read:
--1. A bottle pourer, comprising a base for fitting to an opening of a bottle, a pourer tube extending from the base for pouring liquid out of the bottle, through a mouth at distal end of the pourer tube, and a tube cover that extends from the base to the distal end of the pourer tube, wherein the tube cover is actuable at the base to move between closed and open positions, the tube cover closing the mouth at the distal end of the pourer tube in the closed position, and opening the mouth at the distal end of the pourer tube in the open position, wherein the tube cover comprises a closure retention element that engages with the base when the tube cover is in the closed position, to prevent unintentional movement of the tube cover to the open position.--

Signed and Sealed this
Ninth Day of August, 2022

*Katherine Kelly Vidal*

Katherine Kelly Vidal
*Director of the United States Patent and Trademark Office*